United States Patent
Hallberg

(10) Patent No.: US 6,658,199 B1
(45) Date of Patent: Dec. 2, 2003

(54) METHOD FOR TEMPORALLY SMOOTH, MINIMAL MEMORY MPEG-2 TRICK PLAY TRANSPORT STREAM CONSTRUCTION

(75) Inventor: Bryan Severt Hallberg, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/465,495

(22) Filed: Dec. 16, 1999

(51) Int. Cl.[7] .............................. H04N 5/91; H04N 7/26
(52) U.S. Cl. ......................................... 386/68; 386/111
(58) Field of Search ........................... 386/6–8, 33, 18, 386/81–82, 111–112; 725/88–90, 102, 96

(56) References Cited

U.S. PATENT DOCUMENTS

| | | |
|---|---|---|
| 5,717,816 A | 2/1998 | Boyce et al. |
| 5,739,862 A | 4/1998 | Cen |
| 5,768,466 A | 6/1998 | Kawamura et al. |
| 5,771,335 A | 6/1998 | Lee |
| 5,793,927 A | 8/1998 | Lane |
| 5,802,240 A | 9/1998 | Asai |
| 5,832,172 A | 11/1998 | Jeon |
| 5,867,625 A | 2/1999 | McLaren |

OTHER PUBLICATIONS

ATSC Digital Television Standard—Sep. 16, 1995.
ISO\IEC 13818-1—Information technology—Generic coding of moving pictures and associated audio information: Systems Apr. 15, 1996.

Primary Examiner—Thai Tran
Assistant Examiner—Polin Chieu
(74) Attorney, Agent, or Firm—Chernoff, Vilhauer, McClung & Stenzel, LLP

(57) ABSTRACT

The predictive coding and temporally forward nature of MPEG compressed digital video make operation of a digital video recorder in a trick play mode problematic. A method is disclosed for creating an MPEG compliant trick play transport data stream having an optimum number of displayed frames from a standard MPEG digital video transport data stream. Frames are selected from the standard transport stream to be displayed as the trick play display. The frames required to decode the display frames are accumulated in a trick play video display. The transmission time required and the number of frames included in trick play video display are tested to determine if the trick play video display can be decoded and displayed within the time limits of the selected trick play mode and the design limits of the communication channel, decoder, and display of the MPEG digital video system. The length of the trick play video display is adjusted until a trick play transport stream conforming to the data handling limits of the MPEG digital video system is created.

48 Claims, 6 Drawing Sheets

METHOD FOR TEMPORALLY SMOOTH, MINIMAL MEMORY MPEG-2 TRICK PLAY TRANSPORT STREAM CONSTRUCTION

BACKGROUND OF THE INVENTION

The present invention relates to a video recorder and, more particularly, to a method for constructing trick play mode video displays from an MPEG-2 digital video transport stream using a digital video recorder.

A conventional analog video recorder records the video signal in its transmitted analog format (such as, the NTSC signal format). At play time, the recorded signal is transmitted over a cable to a display device which is capable of displaying signals of the transmitted format. In addition to the standard play mode (forward direction, standard speed), analog video recorders are capable of displaying video in several "trick play" modes. Trick play modes include fast forward play, slow forward play, fast reverse play, slow reverse play, and pause. Consumers are likely to expect that a video recorder used in conjunction with digital television (DTV) will have, at least, the same trick play mode capabilities as analog video recorders. However, the MPEG-2 data compression techniques used with DTV make creation of trick play modes from the DTV transport data stream problematic, particularly over a simple, bit rate limited, communication channel between a video recorder and a display device.

Motion video comprises a sequence of images or frames. The images are originally recorded as analog signals. For digital television, the analog signals for a video element of a program are input to an encoder that converts the signals to digital data, compresses the digital data, and combines the digital video data with data related to the audio and data elements of the program to output a single transport data stream. The transport data stream is transmitted to a receiver where a decoder reverses the process to produce a close approximation of the original analog signal for presentation to the viewer. The quantity of data resulting from converting analog signals to digital signals is so great that digital motion video would be impractical if the data could not be compressed. However, there is considerable data redundancy within an image and between the images of a video sequence. MPEG-2 provides a toolkit of techniques that can be used to reduce this redundancy and, thereby, reduce the quantity of data required to digitally describe the images of the video sequence.

The DTV system is based on the MPEG-2 Main profile which provides for three types of video frames (I-, P-, and B- frames). Typically, the succession of frames comprising a video sequence is divided for convenience into groups of frames or groups of pictures (GOP). Each GOP is anchored by an entirely self-coded (intracoded) frame or I-frame. Intracoding data compression techniques are used to reduce data redundancy within a single image, but all of the data necessary to decode and reconstruct an I-frame is transmitted. Since I-frames require a relatively large quantity of data, the number of I-frames is minimized. However, I-frames are periodically required in the data stream to enable recovery of the video stream after channel switching or error outages, and the MPEG-2 standard requires an I-frame at least every 132 frames. P-frames and B-frames are produced with interframe data compression as well intraframe data compression. Interframe data compression uses motion estimation to predict the content of a frame from the content of one or more other reference frames. P-frames are frames which are forward predicted from a previous reference frame (either an I- or P- frame). Data for a P-frame includes motion estimation vectors describing movement of blocks of pixels between the current frame and the frame on which prediction is based and the differential data which must be added to the blocks of the earlier frame to construct the image of the later P-frame. A P-frame requires roughly half the data of an I-frame. On the other hand, a B-frame is bidirectionally predicted from earlier and later reference frames. B-frame data comprises motion estimation vectors describing where data should be taken from the earlier and later frames and typically requires about one-fourth the data of an I-frame. B-frames are used to increase the compression efficiency and perceived picture quality but cannot be used to predict future frames.

MPEG-2 provides flexibility as to use, size, and make up of the GOP, but a 12-frame GOP is typical for a 25 frames per second system frame rate and a 15-frame GOP is typical for a 30 frames per second system. An exemplary 15 frame GOP might comprise the following frames transmitted in the following order:

... $I_0$, $B_0$, $B_1$, $P_0$, $B_2$, $B_3$, $P_1$, $B_4$, $B_5$, $P_2$, $B_6$, $B_7$, $P_3$, $B_8$, $B_9$ ...

At the decoder, the transport stream is decoded, decompressed and reordered to reconstruct the images of the original video image sequence. Since the data from earlier frames must be available to predict and reconstruct later frames, the order of transmission of frames will be different from the order in which the frames will be displayed. This requires the encoder and decoder to reorder the frames, even for standard play mode. In standard forward play mode the frames of this exemplary GOP would be displayed in the following order:

... $B_0$, $B_1$, $I_0$, $B_2$, $B_3$, $P_0$, $B_4$, $B_5$, $P_1$, $B_6$, $B_7$, $P_2$, $B_8$, $B_9$, $P_3$ ...

The I-frame ($I_0$) is the third frame displayed but must be transmitted first so that $P_0$, $B_0$, and $B_1$ can be decoded. Likewise, $P_0$ is transmitted before $B_2$ and $B_3$ because $P_0$ and $I_0$ are necessary to decode the B-frames ($B_2$ and $B_3$) The exemplary GOP is an "open" GOP having a prediction link to a prior GOP. The initial B-frames ($B_0$ and $B_1$) are decoded from the data of frame $I_0$ and the last P-frame ($P_3$) of the previous GOP. MPEG also provides for a closed GOP with no prediction links to frames outside of the GOP. As a result of bidirectional prediction and the temporally forward nature of MPEG-2 compressed digital motion video, the trick play modes that can be created by selecting frames from the transport stream are very limited and reversing the order in which frames are transported is not useful for creating reverse play display modes.

One method used to provide trick play with recorders of MPEG-2 digital video is to first decode and store an entire GOP in the forward direction. The trick play system can then select an appropriate number of frames and a display order to create the trick play video display from the decompressed and decoded frames. However, the decoder must have large and costly frame buffers to store the decompressed versions of all the frames in the GOP. Since this is not required for normal forward play, the cost of the decoder would be substantially increased which would increase the cost of the receiver or video recorder. In addition, the transmission channel between the recorder and the display could easily be overwhelmed by the quantity of decompressed data required for a trick play display, especially in a fast play mode. Further, this technique requires that the entire GOP be decoded, even during fast play modes. To do this, the decoder must be capable of decoding multiple frames in a single normal frame decoding period. Most decoders do not have this capability.

A second method of providing trick play modes is to decode and display only the I-frames of each GOP. An I-frame includes all of the necessary data to decode the frame and, therefore, the I-frames of a video sequence can be decoded and displayed in any order. Since I-frames are typically only one frame in 12 to 15 frames, each I-frame would be displayed for as many frame periods as are required to create the desired frame rate. However, video produced by displaying only the I-frames has a jerky quality because of the large gaps in the content produced by discarding the intervening P- and B-frames.

In a third method of creating a trick play video display sequence, frames are decoded but are not displayed until a frame that has been selected for the trick play video display is reached. The desired frame is then decoded and displayed. Since the method does not produce an MPEG-2 transport stream for transmission between the recorder and receiver, the recorder and the video decoder must reside in the same device so that bit rate control and timing are not issues.

In a fourth method of producing a trick play display, additional I-frames are generated during the recording process and stored on a separate track of the storage medium. The additional I-frames are used to assist in reverse play.

However, generating additional I-frames may require an additional MPEG-2 encoder to be included in the video recorder substantially increasing its cost.

What is desired, therefore, is a method of constructing from an MPEG-2 compliant transport stream a trick play video display frame sequence that can be decoded in a standard MPEG-2 decoder. Further, it is desired that the trick play display video sequence produce a smooth display, minimize memory requirements, and be capable of transmission over a bit rate limited transmission channel between the recorder and a display device.

SUMMARY OF THE INVENTION

The present invention overcomes the aforementioned drawbacks of the prior art by providing a method of creating a trick play video display from a group of MPEG video transport frames comprising the steps of including at least one transport frame in the trick play video display; determining the transmission time for the trick play video display; and reducing the number of frames included in the trick play video display if the transmission time exceeds a maximum transmission time. The number of frames included in the trick play video display is determined by conformance of the transmission time for the trick play display to the data handling limitations of the MPEG compliant decoder, including the elementary buffer, and the communication channel between the recorder and the display device. At least one transport frame is included in the trick play display, but, within the data handling limitations of the system, additional frames may be included in the trick play as required for decoding the displayed frames or to optimize the smoothness of the trick play display.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1A:
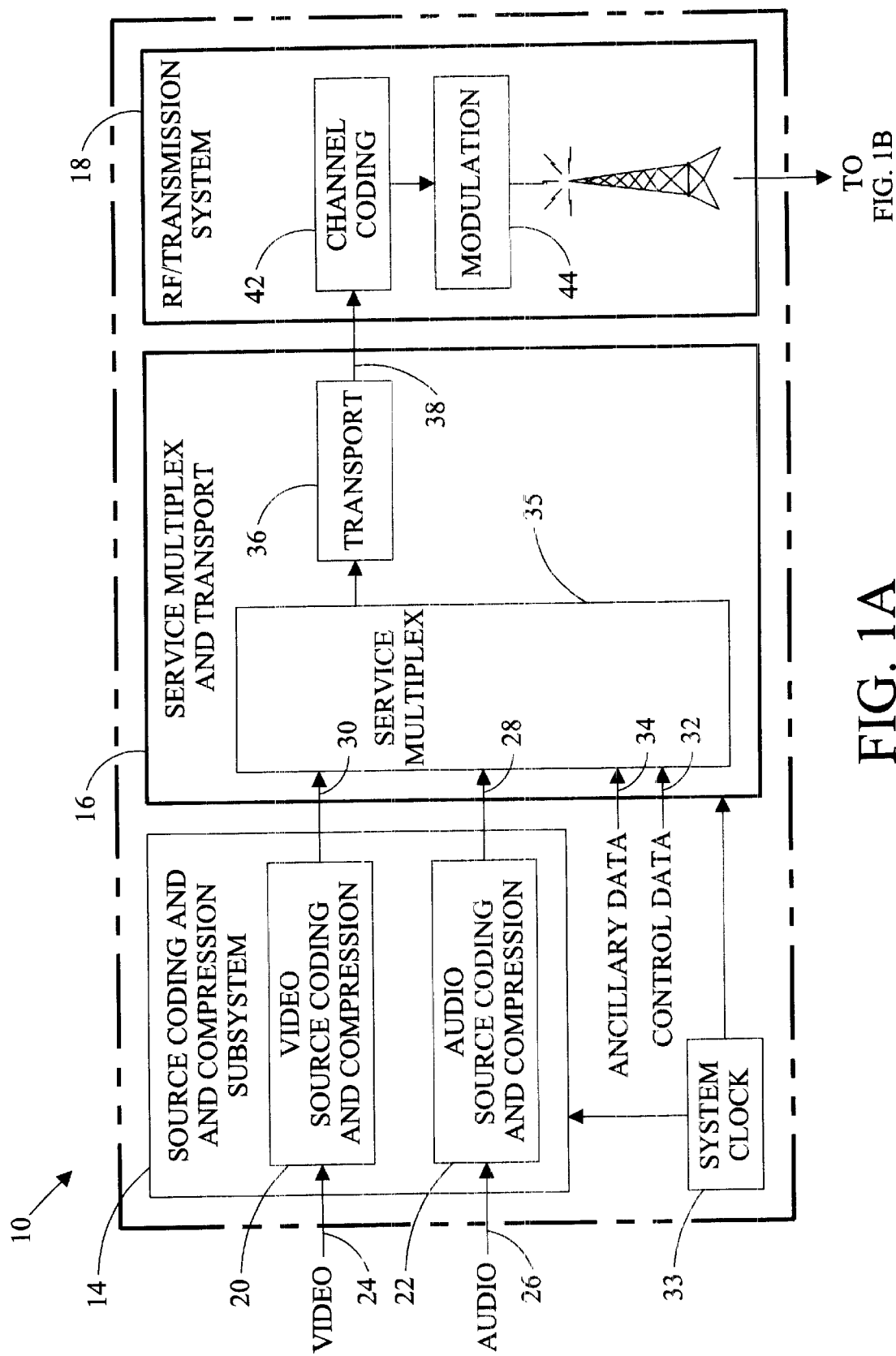
FIG. 1A is a block diagram of an emission station of a digital television system.
Figure 1B:
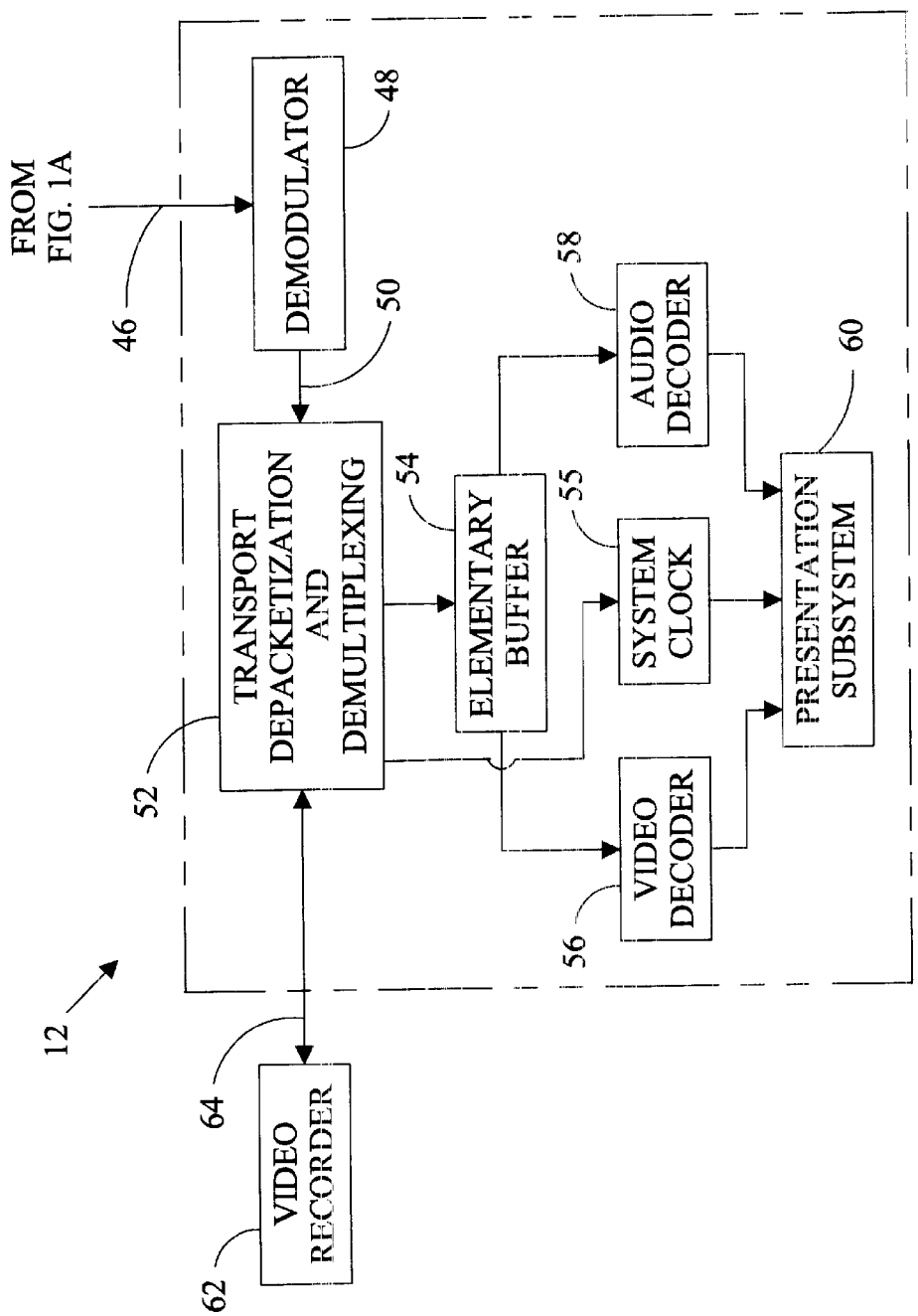
FIG. 1B is a block diagram of a digital television receiver and a video recorder.

A digital television system (DTV) comprises a transmitter or emission station 10, as illustrated in FIG. 1A, and a receiver 12, as illustrated in FIG. 1B. The digital television system is described by the ATSC DIGITAL TELEVISION STANDARD, Advanced Television Systems Committee, Doc A/53, Apr. 12, 1995, Sep. 16, 1995, incorporated by reference herein. Referring to FIG. 1A, the emission station 10 comprises, generally, a source coding and compression subsystem 14, a service multiplex and transport subsystem 16, and an R/F transmission subsystem 18. The source coding and compression subsystem 14 includes a video subsystem 20 and an audio subsystem 22 where analog source signals for the video 24 and audio 26 elements of a program are converted to digital signals and bit rate reduction or data compression methods appropriate to the type of program element are applied to reduce the quantity of data which must be transmitted for that element. Source coding and compression of the video element include reordering the frames of a video sequence and incorporating a designation of their original temporal order in the digital representation of the frame. In the service multiplex and transport subsystem 16, the digital data streams for audio 28, video 30, control data 32, and ancillary data 34 program elements are packetized in a service multiplexer 35 and a transport multiplexer 36. Decoding and presentation timing information and a means of relating a packet to a particular elementary data stream are added to the packets. The several elementary data streams representing the program elements are then multiplexed into a single transport data stream 38. The digital television system employs the MPEG-2 transport stream syntax for packetization and multiplexing of video, audio, and data signals. In the R/F transmission subsystem 18, channel coding 42 is added for error correction and the transport data stream is used to modulate 44 a radio frequency signal for transmission 46.

Referring to FIG. 1B, at the receiver 12, the process is reversed to reconstruct an imperceptibly different approximation of the original sequence of images for presentation to the DTV viewer. The broadcast signal is demodulated in a demodulator 48. The resulting transport data stream 50 is depacketized and demultiplexed in a transport depacketization and demultiplexing subsystem 52. The transport stream data for the individual elementary data streams are stored temporarily in an elementary buffer 54. The data streams for the individual program elements are then decoded and decompressed as appropriate in application decoders, including a video decoder 56 and an audio decoder 58. The decoded data is sent to a presentation subsystem 60 for presentation to the viewer at a time designated by a presentation time stamp associated with each video frame.

The synchronization of the presentation of the elements of a program is controlled by timing information associated with each frame of the video element and each of the data units for the other elements of the program. In the video source coding and compression subsystem 20 the frames of the video sequence are reordered for transport and associated with a temporal reference. Data related to corresponding instants of the video 24 and audio 26 program elements are input to the source coding and compression subsystem 14 at time moments that permit delivery of the encoded and compressed data 28 and 32 to the service multiplex and transport subsystem 16 in synchronization with related moments of the ancillary 34 and control 32 data. System time values generated by a system clock 33 are associated with each video frame or data access unit. One system time value is a presentation time stamp (PTS) specifying the system time at which that frame or data unit is to be presented to the user. A second system time value associated with a frame or data unit is a decoding time stamp (DTS) specifying the system time moment at which decoding of the data of the frame or data unit is to be undertaken. The DTS is optional and may be implied from the program clock reference in the transport stream, the PTS, and the temporal reference for a video frame. The program clock reference (PCR) is a sample of the system clock added periodically to the transport data stream 38 for a program. The PCR is recovered from the data stream at the receiver 12 and used to synchronize the receiver's version of the system clock 55 to the emission station's system clock 33.

Without data compression, the quantity of data resulting from converting analog source signals to digital signals would be too great for a practical DTV system. The DTV system is based on the Main profile of the MPEG-2 standard, ISO/IEC 13818-1, INFORMATION TECHNOLOGY—GENERIC CODING OF MOVING PICTURES AND ASSOCIATED AUDIO INFORMATION, International Standards Organization, 1995. The MPEG-2 standard provides a toolkit of data compression techniques for use in digital motion video applications, such as digital television.

The data compression techniques of MPEG include intraframe and interframe video data compression techniques. Typically, the succession of images or frames comprising a video sequence is divided into groups of frames or groups of pictures (GOP) comprising three types of frames; I-, P-, and B-frames. Each GOP is anchored by an entirely self-coded (intracoded) frame or I-frame. Intraframe coding or intracoding utilizes a number data compression techniques to reduce redundancy in the data of a single image. While the quantity of data required to describe the image is reduced, all of the data necessary to decode and reconstruct the I-frame is transmitted. I-frames require a relatively large quantity of data, so the number of I-frames is minimized. However, I-frames are periodically required to enable recovery of the video data stream after channel switching or error outages and the MPEG-2 standard requires an I-frame at least every 132 frames.

P-frames and B-frames are the result of interframe coding which is directed at reducing the data redundancy between frames. Interframe coding relies on motion prediction to determine the difference between the position and data content of an image in a current frame and a previous frame. The current frame is reconstructed from the content of the previous frame and the information related to the difference between the content of the earlier and later frames. Blocks of pixels in a current frame are identified and a search is made of an earlier frame to locate a similar block. A motion estimation vector describing the direction and distance of movement of the block is calculated. Only the differential data and the motion estimation vector are encoded and transmitted. Data which has been previously transmitted is not sent again. P-frames are forward predicted from an earlier reference frame (either an I- or P- frame). P-frame data includes the motion estimation vectors and differential data necessary to reconstruct the P-frame from the data of the earlier reference frame. A P-frame requires roughly half the data of an I-frame. A B-frame is bidirectionally predicted from both a temporally earlier and a temporally later reference frame (either an I-frame or P-frame). B-frame data comprises vectors describing where data should be taken from the earlier and later frames, and typically requires about one-fourth the data of an I-frame. B-frames are used to increase the compression efficiency and perceived picture quality but cannot be used to predict future frames.

Neither MPEG-2 nor the DTV standard requires the use of GOP but the division of the video data stream facilitates access in the event of channel switching or signal loss due to data error. Further, neither standard establishes the number of frames nor their arrangement in the GOP. However, a 12-frame GOP is typical for a 25 frames per second motion video system and a 15 frame GOP is typical for a 30 frames per second motion video system. An exemplary 15-frame, transport stream GOP might comprise the frames and the transmission order illustrated in FIG. 2. This exemplary GOP is designated as an open GOP by the MPEG standard because it has data links to another GOP. Frames $B_0$ and $B_1$ are bidirectionally predicted from frame $I_0$ and the last reference frame ($P_3$) of the previous GOP.

At the receiver 12, the frames of the transport stream are temporarily stored in the elementary stream buffer (EB) 54. The video frames are then removed, decoded and reordered for presentation at the system's frame rate. Since information from certain frames must be available in order to decode later frames, the order of transmission in the transport stream GOP is not the same as the temporal order in which the frames were originally recorded and in which they will be displayed. The decoder must reorder the frames of the GOP before they are displayed. In standard forward play mode the exemplary transport stream GOP illustrated in FIG. 2 would be displayed in the order illustrated in FIG. 3.

The creation of a trick play video display requires a further reordering of the frames of transport stream GOP to produce a new frame sequence for display. The new sequence may include a different number of frames displayed in a different order than that of the transport stream GOP. In addition, the forward predictive nature of the MPEG coding may require that a number of frames be included in the trick play video display sequence that are used for decoding but are not displayed. However, the data rate of the trick play transport data stream is limited by the system's design to handle decoding and display of video sequences in the forward direction at standard (1×) speed. For example, the decoder is generally capable of decoding only one frame per frame period and, therefore, a trick play GOP must not require that frames be decoded at a faster rate.

Likewise, the capacity of the elementary buffer 54 limits the bit rate of the transport stream. Frames containing differing quantities of data are received at a nearly constant rate from the depacketization and demultiplexing subsystem 52. The data is stored in the elementary buffer 54 until it is removed for decoding at a time specified by the decoding time stamp (DTS) associated with that frame. If data enters the elementary buffer faster than it is removed for decoding the elementary buffer will overflow and data will be lost. The size of the elementary buffer is established by an MPEG specified data variable. Further, the trick play GOP must not require a greater data rate than can be supported by the communication channel 64 between the video recorder 62 and the receiver 12. In the present invention, the original MPEG-2 broadcast transport stream is edited at "play time" to create a new MPEG-2 compliant trick play transport stream which can be decoded by a standard MPEG-2 decoder to produce the desired trick play video display mode. Frames are selected from a transport stream GOP for inclusion in the trick play video display. The trick play transport stream GOP contains some of the P- and B-frames of the original transport stream to produce a relatively smooth trick play display. To create the desired trick play display frame sequence, the frames from the transport stream GOP are reordered, repeated, and time stamped again, as necessary. The time required to transmit the new trick play GOP to the elementary buffer 54 is determined and compared to a maximum transmission time which is established from the design limitations for the communication channel 64, an MPEG compliant video decoder 56, and an elementary buffer 54. If the required transmission time exceeds the maximum time permitted, the number of frames in the trick play GOP is reduced until the system is capable of transmitting the trick play GOP within the constraints imposed on the system by its design for processing MPEG video in the forward mode at standard speed.

Figure 2:
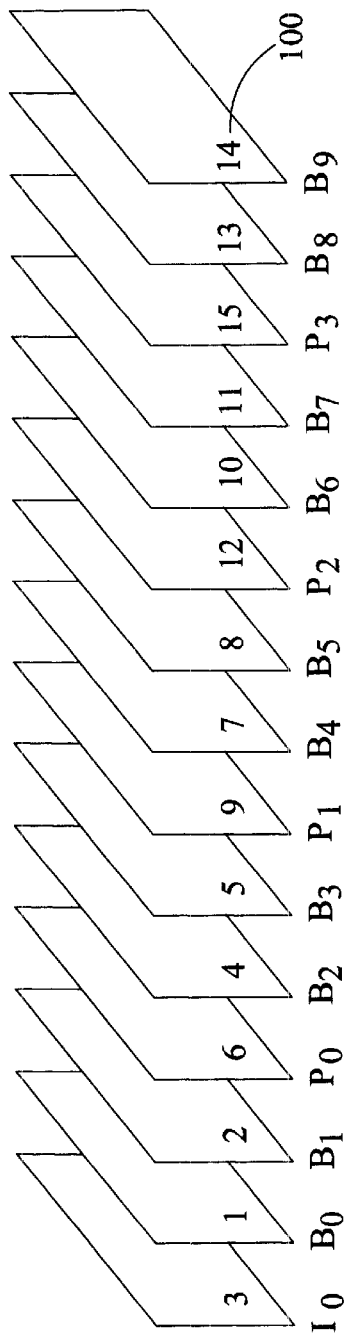
FIG. 2 is an illustration of an exemplary arrangement of a group of pictures of an MPEG transport stream.
Figure 3:
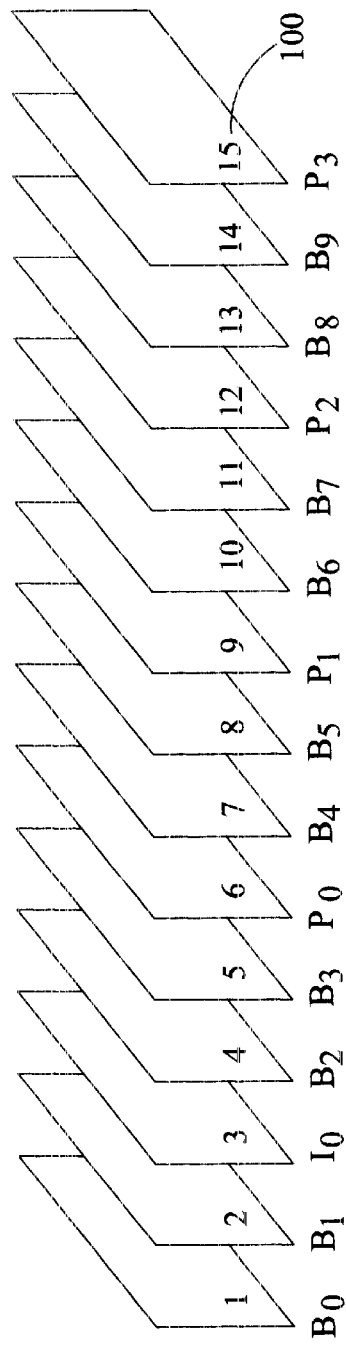
FIG. 3 is an illustration of an exemplary temporal ordering of a group of pictures of an MPEG transport stream.
Figure 4:
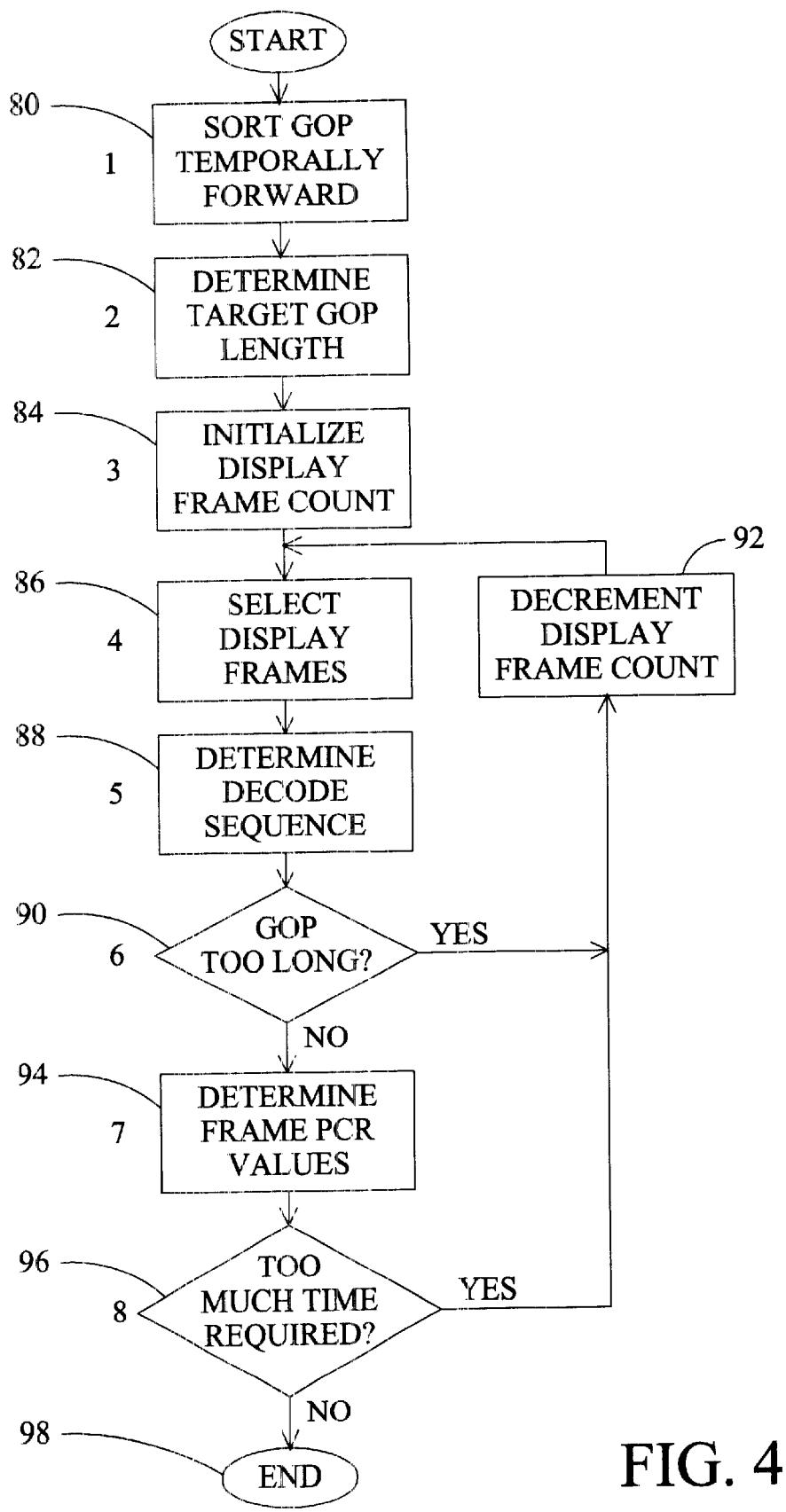
FIG. 4 is a flow diagram of the method of creating a trick video display of the present invention.

The steps in the creation of an MPEG complaint transport stream for a trick play video display by the method of the present invention are illustrated in FIG. 4. An initial step in creating a trick play GOP is to temporally sort the frames of the original transport stream GOP 80 into the original display order. As illustrated in FIG. 2, each frame in an MPEG-2 transport stream is associated with a temporal reference 100. The temporal reference specifies the order in which the associated frame is to be displayed relative to the other frames of the transport GOP. FIG. 3 illustrates a temporal sorting of the exemplary 15 frame transport stream GOP that is illustrated in FIG. 2.

A target number of frames to be included in the trick play GOP is established 82. The target number of frames is equal to the number of frames in the original transport stream GOP divided by the absolute value of the relative display speeds of the selected trick play and normal play modes. For example, twice (2×) normal speed suggests that frames be displayed at twice the normal rate. However, the frame rate is fixed for the system and, therefore, the 2× trick play display would display approximately one-half as many frames as are contained in the original GOP in approximately one-half the total display time of the standard speed, normal play mode display of the GOP. If the original transport stream GOP is 15 frames in length and the trick play speed is to be two times normal play speed, the target number of frames would be 7.5 (15/2) frames. A GOP cannot contain a fractional frame. Therefore, the target number of frames in the trick play GOP is adjusted to either seven or eight frames and the target number of frames in a subsequent GOP is adjusted to absorb any fractional frames resulting from the calculation.

In the next step of the method, a frame displayed counter is established and initialized 84 to the target number of frames. The frames displayed counter indicates the number of frames of the original transport stream GOP that are to be included in the trick play video display GOP. GOPs are displayed successively in a continuous fashion and in some cases the display of the last frame of a previous GOP might intrude into the display time of a current GOP. In these cases, the number of frames in the GOP is reduced by the number of frame periods that the last frame of the previous GOP intrudes into the display time of the current GOP and the frames displayed counter is decremented accordingly.

Referring to FIG. 4, the frames of the transport stream GOP that will be displayed as the trick play video display are selected from the temporally forward sorted transport stream GOP 86. One at a time storage and processing of GOPs reduces the storage requirements and cost of the VCR. However, some frames of an open GOP are predicted from the frames of another GOP and cannot be decoded if only the current GOP is available. Therefore, for reverse play modes all B-frames ($B_0$ and $B_1$ as illustrated in FIG. 3) temporally preceding the first I-frame of a GOP are discarded. Decoding of these frames is dependent upon the previous GOP's last reference frame (P- or I-frame). During reverse play, this reference frame will not be decoded until some time in the future. If the trick play mode is a forward play mode, the initial B-frames ($B_0$ and $B_1$) are discarded only if the last reference frame of the previous GOP was not decoded. If storage is included in the system to retain more than a single GOP, discarding frames from the original transport stream would not be required. The new GOP (with or without the initial B-frames) is referred to as the reduced GOP and has a number of frames designated herein as reduce_GOP_size.

Figure 5:
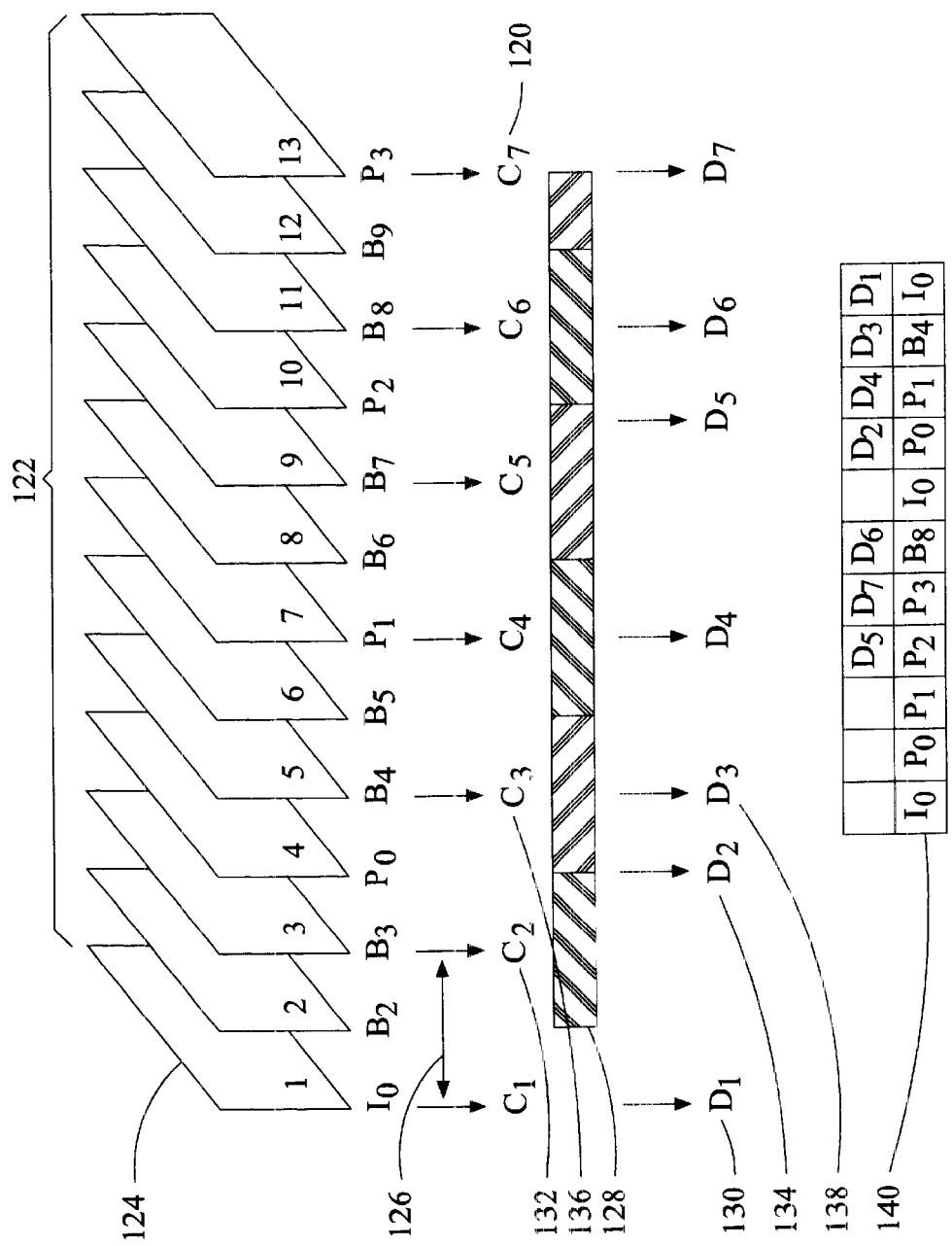
FIG. 5 is an illustration of the selection of frames for a group of pictures for a reverse play mode trick play display.

Referring to FIG. 5, frames to be displayed (display frames) of the trick play video display are selected by selecting candidate display frames and then searching for and selecting preferred frames in the vicinity of the candidate display frames. Candidate display frames (C) 120 for the trick play video display are selected from the available frames of the reduced GOP 122 (indicated by a bracket) by selecting the first frame of the reduced GOP 124 and then selecting frames equally spaced in the GOP. The spacing of candidate frames 126 is specified by a frame spacing variable (frame spacing) which need not be an integer and has a minimum value of one. Frame spacing is determined by the equation:

$$\text{frame\_spacing} = \max\left(1, \frac{\text{reduced\_GOP\_size}}{\text{frames\_displayed}}\right)$$

FIG. 5 illustrates selection of frames for a 2× normal speed, reversed play mode from a 15 frame temporally ordered, exemplary transport stream GOP. Discarding the initial B-frames for a reversed trick play display mode produces a 13 frame reduced GOP 123. At 2× speed, the frames displayed variable may be, initially, rounded up to seven frames and frame spacing 126 is approximately two frames. Seven candidate frames ($C_1$ through $C_7$) 120 are selected from the 13 frames of the reduced GOP 122 by selecting the first intracoded frame 124 of the GOP and six additional frames equally spaced in the temporally sorted GOP.

The selection of display frames is refined by preferentially selecting display frames from the frames in a vicinity 128 of the candidate frames. Any I-frame within a specified search distance of a candidate display frame is selected over any P-frame and any P-frame within the search distance is selected over any B-frame. The preferred search distance is function frame_spacing divided by two or:

$$\text{search\_distance} = \text{ceiling}\left(\frac{\text{frame\_spacing}}{2}\right)$$

Referring again to FIG. 5, a search is made for preferred frames in a vicinity 128 equal to the search distance (one in the example) before and after each candidate frame 120. The initial display frame selected ($D_1$) 130 is the I-frame ($I_0$) and is retained because I-frames are preferred to P- and B-frames. On the other hand, searching temporally before and after the candidate frame ($C_2$) 132 results in the selection of $P_0$ as the second display frame ($D_2$) 134 because the P-frame is preferred to either of the two B-frames in the vicinity of $B_3$. Searching the vicinity of the candidate frame ($C_3$) 136, identifies $P_0$, $B_4$, and $B_5$ as potential display frames. A frame that has already been selected as a display frame using one candidate frame as a seed is not selected when another candidate frame is used as a seed. As a result, frame $B_4$ is selected as the display frame ($D_3$) 138 because frame $P_0$ has already been selected as a display frame using candidate frame ($C_2$) as a seed.

Preferably, bifurcation is used to establish the order in which candidate frames are searched for display frames. Using bifurcation, the selected frame is the frame farthest from all other selected frames and from the edges of the reduced GOP. For a reduced GOP containing frames numbering from zero to the number of frames in the reduced GOP (reduced_GOP-size) minus one, the selected candidate frame index $C_n$ is the frame which satisfies the equation: selected candidate frame index $C_n$ is the frame which satisfies the equation:

$$C_n = \min_{i=0 \text{ to reduced\_GOP\_size}-1}\left[\frac{1}{i+1} + \frac{1}{\text{reduced\_GOP\_size}-1} + \left(\sum_{j=0}^{n-1}\frac{1}{|i-C_j|}, i \neq C_j\right)\right]$$

Referring again to FIG. 4, following selection of frames to be displayed, the sequence of frames to be decoded is determined 88. The forward nature of MPEG video requires that frames be decoded in a particular order and that certain frames be decoded to permit others to be decoded. This may mean that decoding of a number of frames that are not displayed may be necessary to permit decoding of the display frames. This is particularly true for trick play modes providing reverse display. The transport stream GOP is searched from an initial search frame and in a search direction dictated by the selected trick play mode to identify each frame that has been selected for display as part the trick play video display. If the trick play mode is forward play, the order of display is from the temporal first frame to the last frame of the reduced GOP. In the event of a reverse play mode, the display order is from the temporal end of the reduced GOP to its start. As each display frame is located, all frames that must be decoded to decode the display frame are identified. Each of the frames required for decoding a display frame is appended to the trick play GOP in the order in which the frames must be decoded. Referring to again FIG. 5, the first display frame of the reversed 2× trick play GOP is frame $P_3$. Decoding of frame $P_3$ requires decoding of the frame sequence; $I_0$, $P_0$ $P_1$ and $P_2$. Therefore, frames $I_0$, $P_0$, $P_1$, $P_2$, and $P_3$ are appended at the beginning of the trick play GOP 140. The second frame to be displayed is frame $B_8$. This frame is bidirectionally predicted from frames $P_2$ and $P_3$. If the selected display frame is a B-frame located between the last two decoded reference frames, then only the B-frame need be decoded. Since frame $B_8$ is temporally positioned between reference frames $P_2$ and $P_3$ (the last two reference frames decoded), frame $B_8$ is appended to the trick play GOP 140 as indicated. If the display frame is a B-frame between two reference frames which, in turn, occur after the last two decoded reference frames, then all reference frames occurring after the last decoded reference frame up to and including the reference frame occurring just after the B-frame must be decoded. In addition, the selected B-frame display frame must be decoded. If the display frame is a B-frame between two reference frames occurring before the last two decoded reference frames, then the reference frame decoding must restart at the nearest previous I-frame and proceed to the reference frame occurring just after the selected B-frame. In addition, the B-frame selected for display must be decoded.

The third display frame is frame $P_2$. Since the display frame $P_2$ is one of the last two decoded reference frames (an I-frame or a P-frame), repeated decoding is not necessary. If the display frame is a reference frame occurring after the last two decoded reference frames, then all reference frames after the last decoded reference frame including the reference frame to be displayed must be decoded. If a selected display frame is a reference frame and occurs temporally earlier than the last two decoded reference frames, then the reference frame decoding must start at the nearest, previous I-frame and proceed to the display frame. For example, the fourth display frame $P_1$ is temporally earlier in the transport stream GOP than the last two decoded reference frames (frames $P_2$ and $P_3$) and, therefore, frames $I_0$ and $P_0$ are appended to the trick play GOP to permit decoding of frame $P_1$ which is appended to the GOP for decoding and display.

The fifth display frame is $B_4$. Since $B_4$ is temporally located between the last two decoded reference frames ($P_0$ and $P_1$) it is appended to the trick play GOP. Since display frame $B_4$ occurs between reference frames $P_0$ and $P_1$ and since frame $P_1$ occurs after the last two decoded reference frames ($I_0$ and $P_0$); frame $P_1$ must be decoded to decode display frame $B_4$.

Referring again to FIG. 4, when the trick play GOP decoding sequence has been determined, the length of the trick play GOP is tested to determine whether it contains more frames than the specified target number of GOP frames 90. A trick play GOP containing more frames than the target number of frames, will require that multiple frames be decoded in a single frame period to display the display frames at the rate required by the trick play mode. If the trick play GOP is too long, then the frames displayed variable is decremented 92 and a new trick play GOP with a lesser number of display frames is selected from the reduced transport stream GOP using the process described above. On the other hand, maximizing the number of displayed frames in the trick play GOP improves the smoothness of the trick play display.

Figure 6:
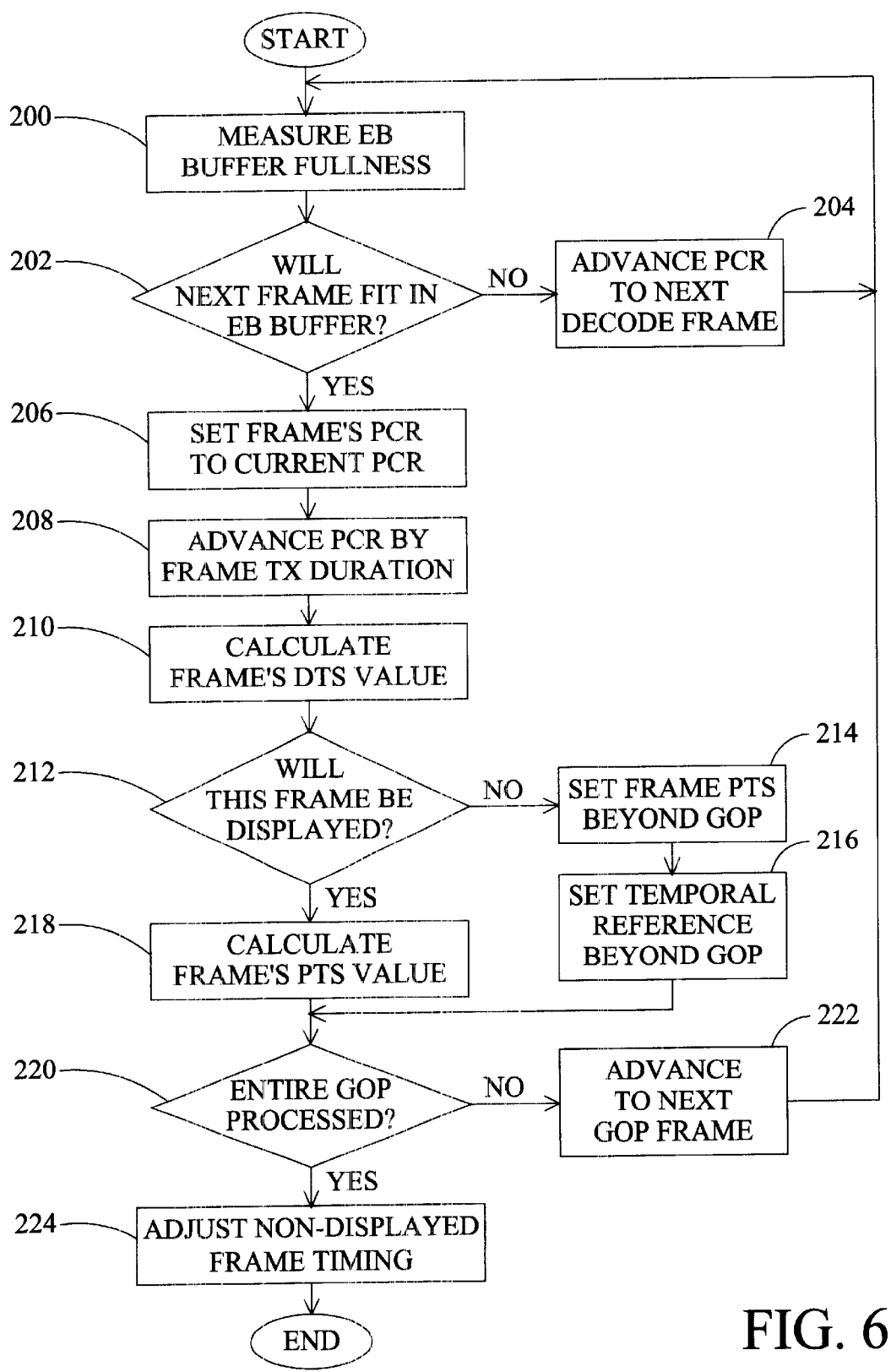
FIG. 6 is a flow diagram of a method of determining program clock reference values of the frames of a trick play video display; a step of the method illustrated in FIG. 4

If the length of the trick play GOP is acceptable, a new program clock reference (PCR) is determined for and associated with each frame of the trick play GOP 94. The steps of the PCR calculation are illustrated in the flow chart of FIG. 6. Referring to FIG. 6, first, the space available in the elementary buffer (EB) 54 is determined 200. The current PCR value is compared with the decoding time stamp (DTS) of each frame having a previously assigned DTS. The DTS specifies the time at which the frame is to be removed from the elementary buffer to begin decoding. If the DTS value of a frame is greater than the current PCR value, then the frame remains in the elementary buffer and the frame's size is subtracted from the total capacity of the buffer to determine the available space in the buffer. After determining the available space in the elementary buffer, the size of the current frame is compared to the available space to determine whether the current frame will fit in the buffer 202. If there is insufficient space in the buffer, the current PCR is set to the earliest DTS value of a frame currently in the buffer 204. The effect is to delay storage for one frame period, permitting the oldest frame in the buffer 54 to be removed and the space it occupied to be added to the available storage space. The available space in the elementary buffer 54 is again determined and compared to the size of the next frame until there is sufficient space in the buffer 54 for the frame. When there is sufficient excess space in the buffer 54 to permit storage of the frame, the frame's PCR is set to the current PCR 206. The current PCR value is then adjusted by advancing the PCR by the time required to transmit (TX) the frame to the receiver 208. The time for transmitting a frame is determined by the frame's size and the bandwidth of the communication channel 64.

Following adjustment of the PCR, a new DTS is calculated for the current frame 210. Initially, the new DTS is set to the greater of two values. The first value depends upon whether the previous frame was or was not a B-frame. If the previous frame was not a B-frame, the initial DTS is set to the previous frame's DTS value plus the time required to decode the current frame which is assumed to be one frame period. This allows the previous frame to be fully decoded before decoding of the current frame begins. If the previous frame was a B-frame, the initial DTS is the previous frame's PTS value. This permits the B-frame to be displayed before the current frame begins decoding. Failing to wait for the B-frame to be displayed could cause removal of the B-frame from the decoder's buffer before it can be placed in the buffer in the presentation subsystem 60. The second potential initial value of the new DTS is the start time of the frame period nearest to, but not earlier than, the current PCR. Setting the DTS to this value forces the current frame to begin decoding only on a frame period boundary and only after the frame is completely received in the elementary buffer 54. If the current frame is a reference frame (I- or P-frame), the current DTS is further set to the maximum of the previously calculated initial DTS or the PTS of the oldest of the last two decoded reference frames. Adjusting the DTS in this manner assures that only two decoded reference frames are allowed to be in storage at any time in the elementary buffer 54, avoiding buffer overflow.

After determining a new DTS for the current frame, a determination is made whether the current frame will be displayed 212. A frame may be decoded to facilitate decoding a display frame, but may not itself be displayed. Due to the forward predictive nature of MPEG-2 only the last decoded occurrence of a frame is actually displayed. If a frame will not be displayed, then its PTS 214 and temporal reference 216 values are set well beyond the PTS and temporal reference values of the trick play GOP's last frame. When the subsequent GOP is decoded, the initial temporal reference value is reset to zero and frames from the earlier GOP will not be displayed.

If the frame will be displayed, a new presentation time stamp (PTS) is calculated for the frame 218. The PTS is the moment of the system time at which the frame will be presented. The PTS for the initial, displayed frame of the trick play GOP is set equal to the frame's DTS plus the time required to decode the frame. The time required to decode a frame is preferably assumed to be one frame period. If the current frame is not the first display frame of the trick play GOP, then its PTS will be set to the greater of either the frame's DTS value plus the frame decoding time or a target PTS value. The target PTS attempts to position the frame's presentation time relative to other frames of the trick play GOP in a position approximately proportional to that frame's presentation time in the frames of the original transport GOP. The purpose of the target GOP is to temporally smooth the trick play video display. The target GOP is determined by the following equation:

$$\text{target\_PTS} = \text{first\_frame\_PTS} + ((\text{frame\_period}) \cdot (\text{target\_GOP\_frames} - 1)) \cdot \left| \frac{(\text{first\_temporal\_reference}) - (\text{current\_temporal\_reference})}{(\text{first\_temporal\_reference}) - (\text{last\_temporal\_reference})} \right|$$

where: first_frame_PTS=the PTS value of the first frame to be displayed in the trick play display frame_period=the amount of time a single frame is displayed target_GOP_frames=the desired number of frames to be included in the trick play GOP first_temporal_reference=the temporal reference value from the original transport stream GOP of the first frame displayed in the trick play video display current_temporal_reference=the temporal reference from the transport stream GOP of the current frame of the trick play GOP last_temporal_reference=the temporal reference from the transport stream GOP of the last frame of the trick play GOP As the result of this adjustment of the PTS, the elapsed times between the presentation of the first frame of the original GOP that is displayed in both the original and trick play GOPs and a display frame of interest is approximately proportional to the relative lengths of the two GOPs.

Following determination of the timing information associated with a frame of the trick play GOP, the completion of processing of all trick play GOP frames is checked 220. If processing is not complete, the method advances to the next trick play GOP frame 222 and proceeds as described above. If processing is complete, the trick play GOP is scanned to locate each display frame. If the trick play GOP includes a frame that is not displayed but which is identical to a display frame, the temporal reference and PTS of the non-displayed frame are set to the values of those parameters associated with the displayed version of the frame 224.

Referring again to FIG. 4, after determining the PCR values for the frames of the trick play display, the transmission time of the trick play GOP is tested 96. If the transmission time is excessive, the frames displayed variable is decremented 92 and a new trick play display is selected, processed and tested. The transmission time is excessive if the time between the trick play GOP's first and last bit is greater than the product of the target number of frames in the trick play GOP (target_GOP_frames) and the incremental change in the PCR per frame. The transmission time may be estimated by adding the required transmission time (in system clock intervals) for the last frame to the difference between the PCRs of the first and last frame.

When a trick play GOP has been created that satisfies the transmission time requirements, the trick play video display selection process ends 98 and the trick play video display transport stream is packetized. The packetization comprises normal video frame packetization steps including adding required stuffing bytes and adjusting the frame header's delay variable as provided in the MPEG-2 standard. With completion of packetization, a new MPEG-2 compliant transport stream for the trick play video display is available for decoding in an MPEG-2 compliant decoder.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of creating a trick play video display from a group of MPEG video transport frames comprising the steps of:
    (a) including at least one said transport frame in said trick play video display;
    (b) determining a transmission time for said trick play video display; and
    (c) reducing a number of frames included in said trick play video display if said transmission time exceeds a maximum transmission time.

2. The method of claim 1 wherein the step of including at least one said transport frame in said trick play video display comprises the steps of:
    (a) determining a target number of frames for said trick play video display;
    (b) selecting at least one said transport frame as a trick play display frame;
    (c) including in said trick play video display at least one said transport frame required to decode said trick play display frame; and
    (d) removing at least one said trick play display frame from said trick play video display if said number of said transport frames included in said trick play video display exceeds said target number.

3. The method of claim 2 wherein said target number is a function of a number of said frames included in said group of transport frames, a display speed of said trick play video display and a standard display speed for said group of transport frames.

4. The method of claim 3 wherein said function determining said target number comprises a product of said number of said frames in said group of transport frames and a ratio of said trick play video display speed and said standard display speed.

5. The method of claim 2 wherein selecting at least one said transport frame as a trick play display frame comprises the steps of:
    (a) sorting said group of transport frames in a temporal order;
    (b) selecting a trick play video display mode; and
    (c) selecting said at least one trick play display frame from said temporally ordered transport frames as a function of said selected trick play video display mode.

6. The method of claim 5 comprising the further step of removing from said temporally sorted group of transport frames a bidirectionally predicted transport frame preceding a first temporally ordered intracoded transport frame if said selected trick play display mode provides a temporally reversed display order.

7. The method of claim 5 comprising the further step of removing from said temporally sorted group of transport frames a bidirectionally predicted transport frame preceding a first temporally ordered intracoded transport frame if said trick play display mode provides a temporally forward display order and a temporally last reference frame of a temporally preceding group of transport frames was not decoded.

8. The method of claim 5 wherein selecting said at least one trick play display frame from said temporally ordered group of transport frames as a function of said selected trick play video display mode comprises the steps of:
    (a) determining a display frame spacing;
    (b) designating a first intracoded frame of said temporally ordered group of transport frames as a first candidate display frame; and
    (c) designating as an additional said candidate display frame a said transport frame separated by said display frame spacing from said first candidate display frame and any other candidate display frame.

9. The method of claim 8 further comprising the steps of:
    (a) establishing a search vicinity to said candidate frame; and
    (b) preferentially selecting a transport frame in said search vicinity of said candidate frame as said trick play display frame.

10. The method of claim 9 wherein preferentially selecting a transport frame comprises the steps of:
    (a) designating a bidirectionally predicted candidate frame as said trick play display frame if at least one of a forward predicted transport frame and a said intracoded transport frame is not included in said search vicinity;
    (b) designating said forward predicted frame in said search vicinity as said trick play display frame if a said intracoded transport frame is not included in said search vicinity; and
    (c) designating an intracoded frame in said search vicinity as said display frame.

11. The method of claim 10 wherein designation of a transport frame for preferential selection comprises the steps of:
    (a) bifurcating said search vicinity; and
    (b) searching said bifurcated search vicinity for a transport frame for preferential selection as said trick play display frame.

12. The method of claim 2 wherein including in said trick play video display at least one said transport frame required to decode said trick play display frame comprises the steps of:
    (a) ordering said group of transport frames in a temporal order;
    (b) selecting a trick play display mode;
    (c) identifying a said trick play video display frame by searching said temporally ordered transport frames from an initial search frame and in a search direction determined by said selected trick play display mode;
    (d) identifying at least one said transport frame requiring decoding to decode said trick play video display frame; and
    (e) appending said at least one transport frame requiring decoding to said trick play video display in an order to permit temporally forward decoding of said trick play display frame.

13. The method of claim 12 comprising the further step of removing from said temporally sorted group of transport frames a bi-directionally predicted frame preceding a first temporally ordered intracoded frame if said trick play display mode provides a temporally reversed display order.

14. The method of claim 12 comprising the further step of removing from said temporally sorted group of transport frames a bi-directionally predicted frame preceding a first temporally ordered intracoded frame if said trick play display mode provides a temporally forward display order and a temporally last reference frame of a temporally preceding group of transport frames is not decoded.

15. The method of claim 1 wherein said maximum transmission time is a function of a target number of frames for said trick play video display and a program clock reference time increment for each said frame.

16. The method of claim 15 wherein said target number of frames is a function of a number of said frames included in said group of transport frames, a display speed of said trick play video display and a standard display speed of said group of transport frames.

17. The method of claim 1 wherein said transmission time is a function of a period required for transmitting a last frame of said trick play video display to a decoder and an elapsed period between a program clock reference for a first frame of said trick play video display and a program clock reference for said last frame of said trick play video display.

18. The method of claim 17 wherein determination of said elapsed period between said first frame program clock reference and said last frame program clock reference comprises the steps of:
   (a) determining a current frame program clock reference when an elementary buffer has sufficient excess data capacity to store a current frame;
   (b) advancing said current frame program clock reference by a period required for transmitting said current frame to a decoder;
   (c) if said current frame is not said last frame of said trick play video display, setting an initial current frame program clock reference for a next frame to said current frame program clock reference, and
   (d) determining a difference between said current frame program clock reference for said first frame and said current frame program clock reference for said last frame of said trick play video display.

19. The method of claim 18 wherein determining a current frame program clock reference when an elementary buffer has sufficient excess data capacity to store a current frame comprises the steps of:
   (a) determining a quantity of data comprising said current frame;
   (b) determining an excess data capacity of said elementary buffer;
   (c) if said excess data capacity is less than said quantity of data comprising said current frame, setting said current frame program clock reference to a moment equal to an earliest decoding time of a frame currently stored in said elementary buffer; and
   (d) if said excess data capacity is greater than said quantity of data comprising said current frame, setting said current frame program clock reference to a current instant of a system time.

20. The method of claim 1 further comprising the steps of:
   (a) determining a decoding time for said at least one transport frame of said trick play video display;
   (b) determining if said at least one transport frame of said trick play video display will be displayed;
   (c) determining a presentation time for said at least one transport frame if said transport frame will be displayed.

21. The method of claim 20 further comprising the steps of:
   (a) locating a said transport frame that will not be displayed but which is identical to a transport frame that will be displayed;
   (b) setting a trick play video display temporal reference for said transport frame that will not be displayed equal to a trick play video display temporal reference of said transport frame that will be displayed; and
   (c) setting a trick play video display presentation time for said transport frame that will not be displayed equal to a trick play video display presentation time of said transport frame that will be displayed.

22. The method of claim 20 further comprising the step of adjusting said presentation time for said displayed transport frame to cause presentation of said frame at an approximately proportional elapsed period relative to a presentation time for a first displayed frame from said group of transport frames in both said trick play display and said group of transport frames.

23. A method of creating a trick play video display from a group of MPEG transport video frames comprising the steps of:
   (a) establishing a target number of said transport frames for said trick play video display;
   (b) selecting at least one of said transport frame as a trick play display frame of said trick play video display;
   (c) including in said trick play video display at least one said transport frame required to decode said trick play display frame;
   (d) removing at least one said trick play display frame from said trick play video display if a number of said transport frames included in said trick play video display exceeds said target number;
   (e) removing at least one said trick play display frame from said trick play video display if a transmission period for said trick play video display exceeds a predetermined maximum transmission period; and
   (f) constructing an MPEG compliant data stream for said trick play video display.

24. The method of claim 23 wherein said target number is a function of a number of said frames included in said group of transport frames, a display speed of said trick play video display and a standard display speed for said group of transport frames.

25. The method of claim 24 wherein said function determining said target number comprises a product of said number of said frames in said group of transport frames and a ratio of said trick play video display speed and said standard display speed.

26. The method of claim 23 wherein selecting at least one said transport frame as a trick play display frame further comprises the steps of:
   (a) sorting said group of transport frames in a temporal order;
   (b) selecting a trick play video display mode; and
   (c) as a function of said selected trick play video display mode, selecting said at least one trick play display frame from said temporally ordered group of transport frames.

27. The method of claim 26 comprising the further step of removing from said temporally sorted group of transport frames a bi-directionally predicted transport frame preceding a first temporally ordered intracoded transport frame if said trick play display mode provides a temporally reversed display order.

28. The method of claim 26 comprising the further step of removing from said temporally sorted group of transport frames a bi-directionally predicted transport frame preceding a first temporally ordered intracoded transport frame if said trick play display mode provides a temporally forward display order and a temporally last reference frame of a temporally preceding group of transport frames is not decoded.

29. The method of claim 26 wherein selecting said at least one trick play display frame from said temporally ordered group of transport frames comprises the steps of:
(a) determining a display frame spacing;
(b) designating a first intracoded frame of said temporally ordered group of transport frames as a first candidate display frame; and
(c) designating as an additional said candidate display frame a said transport frame separated by said display frame spacing from said first candidate display frame and any other candidate display frame.

30. The method of claim 29 further comprising the steps of:
(a) establishing a search vicinity to said candidate frame; and
(b) preferentially selecting a transport frame in said search vicinity of said candidate frame as said trick play display frame.

31. The method of claim 30 wherein preferentially selecting a transport frame comprises the steps of:
(a) designating a bi-directionally predicted candidate frame as said trick play display frame if at least one of a forward predicted transport frame and a said intracoded transport frame is not included in said search vicinity;
(b) designating said forward predicted frame in said search vicinity as said trick play display frame if a said intracoded transport frame is not included in said search vicinity; and
(c) designating an intracoded frame in said search vicinity as said display frame.

32. The method of claim 30 wherein selecting a transport frame in said search vicinity further comprises the steps of:
(a) bifurcating said search vicinity; and
(b) searching said bifurcated search vicinity for a transport frame for preferential selection as said trick play display frame.

33. The method of claim 23 wherein including in said trick play video display at least one said transport frame required to decode said trick play display frame comprises the steps of:
(a) ordering said group of transport frames in a temporal order;
(b) selecting a trick play video display mode;
(c) identifying a said trick play video display frame by searching said temporally ordered transport frames from an initial search frame and in a search direction determined by said selected trick play display mode;
(c) identifying at least one said transport frame requiring decoding to decode said trick play video display frame; and
(d) appending said at least one transport frame requiring decoding to said trick play video display in an order to permit temporally forward decoding of said trick play display frame.

34. The method of claim 33 comprising the further step of removing from said temporally sorted group of transport frames a bi-directionally predicted frame preceding a first temporally ordered intracoded frame if said trick play display mode provides a temporally reversed display order.

35. The method of claim 33 comprising the further step of removing from said temporally sorted group of transport frames a bi-directionally predicted frame preceding a first temporally ordered intracoded frame if said trick play display mode provides a temporally forward display order and a temporally last reference frame of a temporally preceding group of transport frames is not decoded.

36. The method of claim 23 wherein said target number of frames is a function of a number of said frames included in said group of transport frames, a display speed of said trick play video display and a standard display speed of said group of transport frames.

37. The method of claim 23 wherein determining if a decoding period for said trick play video display exceeds a predetermined maximum decoding period comprises the steps of:
(a) determining a transmission period between a program clock reference for a first frame of said trick play video display and a time moment of completion of transmission of a last frame of said trick play video display to a decoder; and
(b) comparing said transmission period to a function of said target number of transport frames and an incremental period for transmission of each said frame.

38. The method of claim 37 wherein determination of said transmission period comprises the steps of:
(a) setting a current frame program clock reference equal to a system time moment when an elementary buffer has sufficient excess data capacity to store a current frame;
(b) advancing said current frame program clock reference by a period required for transmitting said current frame to a decoder;
(c) if said current frame is not a last frame of said trick play video display, setting a current frame program clock reference for a next frame of said trick play video display to said current frame program clock reference, and
(e) determining a difference between said current frame program clock reference for said first frame and a current frame program clock reference for said last frame of said trick play video display.

39. The method of claim 38 wherein setting a current frame program clock reference equal to a system time moment when an elementary buffer has sufficient data capacity to store a current frame comprises the steps of:
(a) determining a quantity of data comprising said current frame;
(b) determining an unoccupied data capacity of said elementary buffer;
(c) if said unoccupied data capacity is less than said quantity of data comprising said current frame, setting said current frame program clock reference to a moment equal to an earliest decoding time for a frame currently included in said elementary buffer; and
(d) if said unoccupied data capacity is greater than said quantity of data comprising said current frame, setting said current frame program clock reference to a current instant of a system time.

40. The method of claim 23 wherein the step of constructing an MPEG compliant data stream for said trick play video display comprises the steps of:
(a) determining a decoding time for said at least one transport frame of said trick play video display;
(b) determining if said at least one transport frame of said trick play video display will be displayed;
(c) determining a presentation time for said at least one transport frame if said transport frame will be displayed.

41. The method of claim 40 further comprising the step of adjusting said presentation time for said displayed transport frame to cause presentation of said frame at an approximately proportional elapsed period relative to a presentation time for a first displayed frame from said group of transport frames in both said trick play display and said group of transport frames.

42. The method of claim 40 further comprising the steps of:
(a) locating a said transport frame that will not be displayed but which is identical to a transport frame that will be displayed;
(b) setting a trick play video display temporal reference for said not displayed transport frame equal to a trick play video display temporal reference of said transport frame that will be displayed; and
(c) setting a trick play video display presentation time for said not displayed transport frame equal to a trick play video display presentation time of said transport frame that will be displayed.

43. A method of creating a trick play video display from a group of MPEG video transport frames comprising the steps of:
(a) temporally ordering said transport frames of said group;
(b) selecting a trick play display mode;
(c) establishing a target number of said transport frames for said trick play video display as a function of a number of said transport frames included in said group and a relative of speed of display for said trick play video display mode and standard display of said group of transport frames;
(d) as a function of said trick play display mode, identifying at least one said transport frame as a trick play display frame;
(e) as a function of said trick play display mode, identifying at least one said decode transport frame requiring decoding to decode said trick play video display frame; and
(f) appending said at least one decode transport frame to said trick play video display in an order to permit temporally forward decoding of said trick play display frame;
(g) removing at least one said trick play display frame from said trick play video display if a number of said transport frames included in said trick play video display exceeds said target number;
(h) determining a transmission period for said trick play video display;
(i) comparing said transmission period for said trick play video display to a maximum transmission time for said trick play video display;
(j) removing at least one said trick play display frame from said trick play video display if said transmission period for said trick play video display exceeds said maximum transmission time for said trick play video display;
(k) determining a decoding time for said at least one transport frame of said trick play video display;
(l) determining if said at least one transport frame of said trick play video display will be displayed; and
(m) determining a presentation time for said at least one transport frame if said transport frame will be displayed.

44. The method of claim 43 wherein the step of identifying at least one said transport frame as a trick play display frame comprises the steps of:
(a) determining a display frame spacing;
(b) designating a first intracoded frame of said temporally ordered group of transport frames as a first candidate display frame; and
(c) designating as an additional said candidate display frame a said transport frame separated by said display frame spacing from said first candidate display frame and any other candidate display frame;
(d) searching a vicinity of said candidate display frame;
(e) selecting a bi-directionally predicted candidate frame as said trick play display frame if said transport frames within said vicinity do not include at least one of a forward predicted transport frame and an intracoded transport frame;
(f) selecting a said forward predicted transport frame as a display frame if said transport frames within said vicinity do not include a said intracoded frame; and
(g) otherwise selecting said intracoded frame included in said transport frames within said vicinity as said display frame.

45. The method of claim 44 wherein identifying at least one said decode transport frame requiring decoding to decode said trick play video display frame comprises the steps of:
(a) identifying, as a function of said trick play display mode, an initial search frame in said group of transport frames;
(b) identifying, as a function of said trick play display mode, a direction for searching said group of transport frames;
(c) locating a said trick play display frame by searching said temporally ordered group of transport frames from said initial search frame in said searching direction; and
(d) identifying said at least one said decode transport frame required to decode said trick play display frame in a temporally forward direction.

46. The method of claim 43 wherein determining a transmission period for said trick play video display comprises the steps of:
(a) determining for a first frame of said trick play video display a first frame program clock reference equal to a system time moment at which said first frame is added to an elementary buffer;
(b) determining for a last frame of said trick play video display a last frame program clock reference equal to a system time moment at which said last frame is added to said elementary buffer; and
(c) determining a sum of a period for transmitting said last frame from said elementary buffer to a decoder and a difference between said first frame program clock reference and said last frame program clock reference.

47. The method of claim 43 wherein maximum transmission time for said trick play video display is equal to a function of said target number of frames in said trick play video display and a transmission time increment for each said frame included in said trick play display.

48. The method of claim 43 further comprising the step of adjusting said presentation time for said displayed transport frame to cause presentation of said frame at an approximately proportional elapsed period relative to a presentation time for a first displayed frame from said group of transport frames in both said trick play video display and said group of transport frames.

\* \* \* \* \*

UNITED STATES PATENT AND TRADEMARK OFFICE
CERTIFICATE OF CORRECTION

PATENT NO. : 6,658,199 B1 Page 1 of 1
APPLICATION NO. : 09/465495
DATED : December 2, 2003
INVENTOR(S) : Bryan Severt Hallberg It is certified that error appears in the above-identified patent and that said Letters Patent is hereby corrected as shown below:

On the Title Page, Item (57)
Abstract (line 2)
Change "digital video make operation" to --digital video makes operation--.

Signed and Sealed this

Eleventh Day of November, 2008

JON W. DUDAS
*Director of the United States Patent and Trademark Office*